July 11, 1944.  P. BOURQUE  2,353,123
ELECTRODE HOLDER
Filed April 23, 1942  2 Sheets-Sheet 1
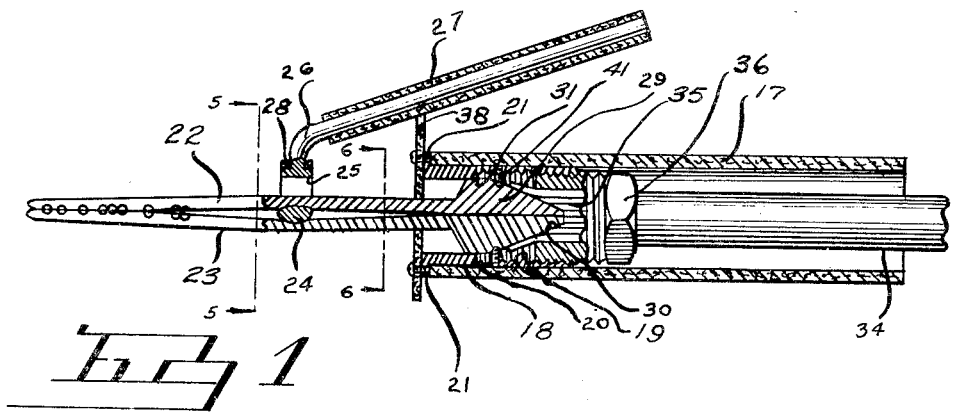
Fig. 1
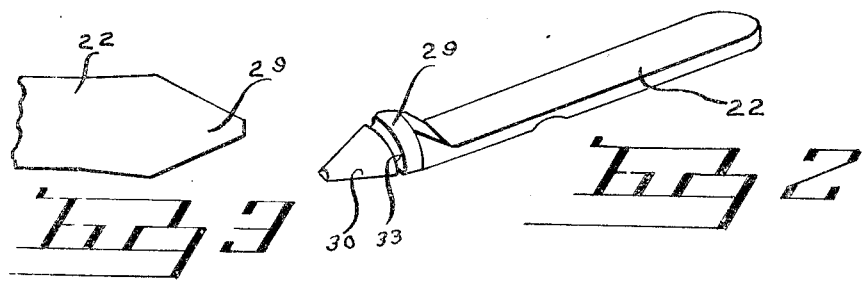
Fig. 2    Fig. 3
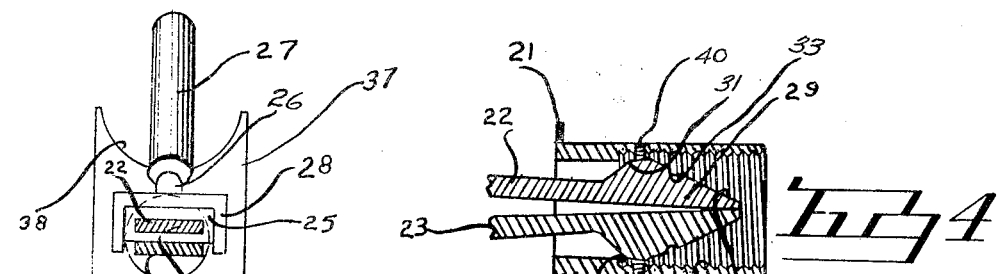
Fig. 4
Fig. 5    Fig. 6
INVENTOR.
PHILIP BOURQUE
BY Thos. Donnelly
HIS ATTORNEY

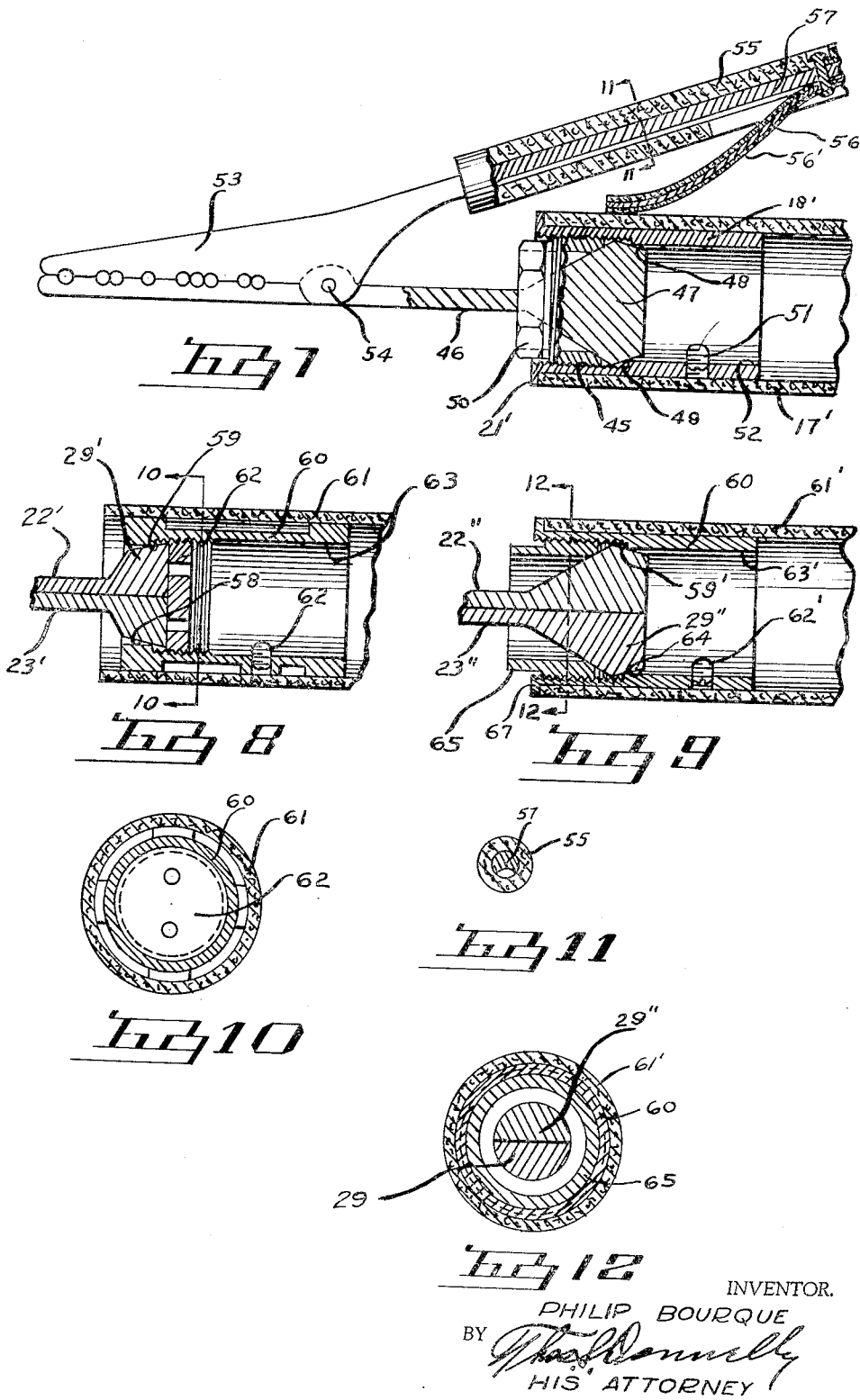

Patented July 11, 1944

2,353,123

UNITED STATES PATENT OFFICE 2,353,123

ELECTRODE HOLDER

Philip Bourque, Detroit, Mich., assignor to Bordon Mfg. Co., Inc., Detroit, Mich., a corporation of Michigan Application April 23, 1942, Serial No. 440,117

10 Claims. (Cl. 219—8)

My invention relates to a new and useful improvement in an electrode holder adapted for use primarily in arc welding purposes.

It is an object of the invention to provide an electrode holder which will be light, simple in structure, possessed of a minimum number of parts, easily and quickly assembled, and so constructed that the various parts may be dis-assembled and assembled quickly.

Another object of the invention is the provision in an electrode holder of a pair of jaws adapted for insertion in a retainer, the parts being so constructed that a securing of the jaws in the retainer will effect a clamping of the jaws together and an adjustment of the tension thereof.

Another object of the invention is the provision in an electrode holder of a pair of jaws adapted for being mounted in registering super-imposed relation and each provided at one end with an engagement head for insertion into a retainer.

Another object of the invention is the provision in an electrode holder of a jaw provided with a head and insertable into a retainer, said retainer and said jaw being so arranged that axial movement of said head relatively to said retainer beyond a predetermined distance will effect a binding of said retainer and said head.

Another object of the invention is the provision in an electrode holder of a tubular retainer having a threaded portion for engaging a jaw-carried head and securing the same in the retainer.

Other objects will appear hereinafter.

It is recognized that various modifications and changes may be made in the detail of structure illustrated without departing from the spirit of the invention and it is intended that such variations shall be embraced within the scope of the claims forming a part hereof.

Forming a part hereof are drawings in which,

Fig. 1 is a longitudinal, central, vertical, sectional view of the invention.

Fig. 2 is a perspective view of one of the jaws used in the invention.

Fig. 3 is a fragmentary plan view of the butt end of a jaw showing the inner face.

Fig. 4 is a fragmentary, central, vertical, sectional view through the retainer and the butt ends of the jaws.

Fig. 5 is a sectional view taken on line 5—5 of Fig. 1.

Fig. 6 is a sectional view taken on line 6—6 of Fig. 1.

Fig. 7 is a fragmentary view of a modified form of the invention with parts broken away, parts shown in section and parts in side elevation.

Fig. 8 is a fragmentary, sectional view of a further modified form of the invention.

Fig. 9 is a fragmentary, sectional view of another modification of the invention.

Fig. 10 is a sectional view taken on line 10—10 of Fig. 8.

Fig. 11 is a sectional view taken on line 11—11 of Fig. 7.

Fig. 12 is a sectional view taken on line 12—12 of Fig. 9.

As shown in the drawings, the holder is illustrated as comprising a handle 17 made from fibre or other suitable material. Inserted in this handle 17 is a tubular metallic retainer 18 having an internally threaded portion 19 terminating in a shoulder 20 and provided on its forward end with a radially projected flange 21.

Gripping members or jaws 22 and 23 are provided. These members are formed from metal so as to serve as electric conductors and at least one of the jaws is formed from resilient material. It will be noted from Fig. 1 that the jaws are divergent from each other proceeding rearwardly from the forward ends and forwardly from the rear ends. Engaging between the jaws intermediate their ends is a bar 24 of a yoke or stirrup from the upper bar 25 of which projects the rearwardly inclined prong or spike 26 over which is positioned a tubular handle 27, thus providing a spreader mechanism or trigger whereby the jaws 22 and 23 may be spread apart upon the rocking of the bar 24. This stirrup is shown insulated on its sides and top by a layer 28 of insulating material. Each of the jaws is provided at its butt end with a semi-conical head 29 tapering to a point 30 and having a peripheral surface 31 inclined to the axis of the jaws.

The construction is such that the tubular retainer 18 may be slid onto the jaws so as to enclose the butt ends 29 as shown in Fig. 4. The cable 34 is provided with a bared end 35 and threaded onto the cable 34 is a jaw nut 36 which may be threaded into the threaded portion 19 of the retainer 18. The construction is such that when the bared end 35 of the cable is flared outwardly, it may be brought into engagement with the tapered ends of the heads 29 and clamped thereagainst by the jam nut 36, this jam nut 36 at the same time forcing an axial relative movement of the retainer 18 and the heads 29, after the inclined surface 31 has engaged the shoulder 20, thus forcing the butt ends of the jaws together and reducing the divergence thereof. In this manner, the relation of the retainer and the butt ends of the jaws is changed from that shown in Fig. 4 to the illustration in Fig. 1.

After the retainer and the butt ends of the jaws have been moved into the position shown in Fig. 1, there might be a tendency for the heads 29 to slip rearwardly of the retainer, because of the engagement of the shoulder 20 with the inclined surface 31. To prevent this, I have provided threaded openings 40 into which set screws 41 may be threaded so as to engage in the indentation or peripheral groove 33 formed in the heads 29. In this way, the heads would be locked against undue rearward movement.

I have illustrated a shield 37 mounted on the holder, this shield having an opening through which the jaws may be projected. The shield is cut away as at 38 to provide clearance for the handle 27. This shield is fastened by screws 39 projected through flange 21 and into the fibre handle 17, thus assembling these parts rigidly together.

In order to assemble the holder, it is but necessary to slip the retainer on the jaws into the position shown in Fig. 4. The jam nut 36 may then be threaded inwardly of the retainer 18 to engage the heads 29 and force them into the position shown in Fig. 1. The set screws 41 may then be moved into engagement in the indentation or groove 33 and thus the parts secured together, after which the jam nut may be removed and the cable attached thereto. In order to disassemble the holder, it is but necessary to remove the jam nut and the sets screws 41, whereupon the retainer 18 may be driven forwardly on the jaws, a sufficient distance to relieve the tension on the jaws and permit the removal of the bar 24.

Thus, it becomes an easy matter to remove and replace the jaws so that the operator may easily and quickly have access to the jaws in separated relation for cleaning and trimming purposes.

It is believed obvious that the degree of movement of the retainer 18 and the heads 29 after the shoulder 20 engages the peripheries of the heads will adjust the tension of the jaws at their free ends on account of the resiliency of at least one of the jaws and the bow-shaped construction. The tapered end of the head 29 serves as a spreader for spreading the bared end of the cable.

In Fig. 7, I have shown a slight modification of the invention in which the handle 17' is provided with a retainer 18'. This retainer 18' is provided with a flange 21' engaging the forward end of the handle 17'. If desired, the retainer may be mounted in the handle 17' as a press fit or secured thereto in any other suitable manner.

In this construction I provide a rigid jaw 46 which serves as an electric conductor and which is provided at its butt end with a head 47 having the peripheral surface 48 inclined to the axis of the head 47 and engaging the shoulder 49 at the end of the internally threaded portion 45 of the retainer 18'. A jam nut 50 embraces the jaw 46 and is threaded into the portion 45 into engagement with the head 47 so as to force the same into tight engagement with the shoulder 49. The retainer 18' is provided with the tubular portion 52 into which the bared end of a cable may be inserted and engaged by the set screw 51 which serves to bind the bared end of the cable and the retainer 18' together.

A cooperating jaw 53 is pivotally mounted by the pin 54 on the jaw 46 and provided with a tubular covering 55 of suitable insulating material. A spring 56 is connected at one end to the extension 57 of the jaw 53 and covered with a covering 56' of insulating material. The free end of this spring bears upon the tubular handle 17' and the tension of the spring serves to tend to normally keep the jaws 46 and 53 in clamping relation.

To dis-assemble the jaws, it is but necessary to remove the pin 54 and to remove the jaw 46, it is but necessary to remove the jam nut 50.

In Fig. 8, I have shown a slight modification in which the jaws 22' and 23', corresponding to the jaws 22 and 23 of Fig. 1, are provided with the head 29' at the butt ends. Each of these head sections is provided with the inclined surface 58 adapted to engage the shoulder 59 at the end of the internally threaded portion of the metallic retainer 60 which is secured in the handle 61. A set screw 62 is adapted to project into the bore 63 of the retainer 60 to clamp an electric cable or conductor therein. A nut 62 is threaded into the threaded portion of the retainer 60 and adapted to engage the end faces of the heads 29' so to move these head sections 29' axially of the retainer and effect the binding and lessening of the divergence referred to in the description of the structure shown in Fig. 1. It is believed obvious that many of the advantages referred to in Fig. 1 are present in the structure shown in Fig. 8.

In Fig. 9, the structure differs from that shown in Fig. 8 in that the direction of movement of the head sections 29" formed on the butt ends of the jaws 22" and 23" is reversed, the head sections 29" being forced by the nut 65 rearwardly of the retainer 60' which is mounted in the handle 61'. These sections 29" are provided with the inclined peripheral surface 64 for bearing against the shoulder 59 formed on the end of the threaded portion of the retainer 60'. This retainer 60' is provided with the bore 63' into which the end of the electric conductor may be inserted and in which the end of the electric conductor may be secured by the set screw 62'. In this form, the retainer 60' is provided with the radial flange 67 which bears against the forward end face of the handle 61', whereas in the form shown in Fig. 8, the retainer 60 is entirely enclosed by the handle 61. In both of these forms shown in Fig. 8 and Fig. 9, the jaws may be easily and quickly separated so that the cleaning of the jaws becomes an easy operation.

It is believed obvious that the retainer 18 serves as a liner for the handle 17 and thus, in effect, becomes part of the handle, so that the axial movement of the jaws may be said to be axially of the retainer or axially of the handle. The handle may also be termed a tubular jaw-supporting member inasmuch as the jaws are supported by the handle and project forwardly therefrom. The butt end portions of the jaws may be said to have a peripheral surface engageable with the inner surface of the handle or tubular member into which they are projected and that upon a movement of the jaws axially of the handle beyond a predetermined distance the peripheral surface of the butt ends and the inner surface of the handle move relatively toward parallelism.

Having thus described my invention what I claim as new is:

1. In an electrode holder of the class described, a tubular retainer; a gripping jaw; a presser head on the butt end of said gripping jaw insertable into said retainer; and a threaded presser member threadable in said retainer and movable axially thereof and engageable with said head for pressing said head and said retainer into engaged relation with each other.

2. In an electrode holder of the class described, a tubular retainer; a pair of gripping jaws arranged in superimposed, registering relation; a presser head on the butt end of each of said jaws; an engagement portion on said retainer for engaging said heads; and a separable threaded member for moving said heads axially of said retainer and retaining the same in engagement with said engagement portion.

3. In an electrode holder of the class described a tubular retainer adapted for electrical connection to an electric conductor; a pair of gripping jaws arranged in superimposed registering relation and divergent of each other forwardly of their rear ends and rearwardly of their forward ends; a head on the rear end of each of said jaws insertable into said retainer and having an inclined peripheral surface; an engagement portion within said retainer for engaging said inclined surface; and means for forcing said heads inwardly of said retainer for effecting a riding of said engagement portion onto said inclined surface.

4. In an electrode holder of the class described, a tubular retainer; an engagement portion within said retainer; a pair of gripping jaws arranged in superimposed registering relation; a head on the butt end of each of said jaws insertable into said retainer and provided with an inclined peripheral surface for engaging said engagement portion; and means threaded into said retainer and engaging said heads for forcing the same inwardly of said retainer.

5. In an electrode holder of the class described, a tubular retainer adapted for connection to an electric conductor, an engaging portion within said retainer; a pair of resilient clamping jaws arranged in superimposed registering relation; a head on the butt end of said jaws having an inclined peripheral surface engageable with said engaging portion; and means threaded into said retainer and engaging said heads for forcing the same inwardly of said retainer and effecting a riding of said engagement portion onto said inclined surface.

6. In an electrode holder of the class described, a tubular retainer adapted for attachment to an electric conductor; an engagement portion within said retainer; a pair of peripheral clamping jaws arranged in superimposed registering relation and divergent of each other at their opposite ends; a head on the butt end of each of said jaws insertable into said retainer and provided with an inclined peripheral surface; and means threaded into said retainer engageable with said heads for forcing the same axially of said retainer and effecting a riding of said engagement portion onto said inclined surface and lessening of the divergence of said jaws.

7. In an electrode holder of the class described, a tubular retainer adapted for attachment to an electric conductor; an engagement portion within said retainer; a pair of gripping jaws arranged in a superimposed registering relation, divergent of each other at opposite ends; a tapered head on the butt end of each of said jaws; and means threadable into said retainer for pressing an electric conductor against said tapered heads and forcing said heads into engagement with said engagement portion.

8. In an electrode holder of the class described, a tubular retainer, adapted for attachment to an electric conductor; an engagement portion within said retainer; a pair of gripping jaws arranged in superimposed registering relation and divergent of each other at their opposite ends; a tapered head on the butt end of each of said jaws and having an inclined peripheral surface engageable with said engagement portion; threaded means for forcing said heads axially of said retainer and effecting a travel of said engagement portion along said inclined surface for reducing the divergence of said jaws at their butt ends; and means engageable with said heads for preventing the riding of said engagement portion off of said inclined surface.

9. In an electrode holder of the class described, a tubular member; a pair of gripping jaws arranged in superimposed registering relation and divergent of each other at their opposite ends; a butt end portion on each of said jaws insertable into said tubular member with the periphery thereof being inclined to the axis of said tubular member and engageable with the inner surface of said tubular member the interengagement of said butt ends with said inner surface being such as to effect, upon axial movement of said butt ends relatively to said inner surface beyond a predetermined distance subsequent to engagement therewith and while non-rotative relatively thereto, a movement of the peripheries of said butt ends toward parallelism with the inner surface of said tubular member; and means projectable through said tubular member for resisting axial movement of said butt end portions relatively to said tubular member.

10. An electrode holder comprising: a tubular supporting member; a pair of gripping jaws arranged in superimposed registering relation and bowed outwardly from each other intermediate their ends; an electrical conductor inserted at one end into said supporting member; a butt end portion on each of said jaws contacting said conductor and engaging the inner surface of said member, the periphery of said butt ends and said engaged inner surface presenting surfaces inclined to each other, said butt ends being axially moveable of said member while rotatively in fixed relation thereto, the interengagement of said butt ends and said inner surface being such as to effect, upon the movement of said butt ends axially of said member beyond a predetermined distance, a movement of said surfaces toward relative parallelism.

PHILIP BOURQUE.